United States Patent [19]
Murakami et al.

[11] Patent Number: 5,137,375
[45] Date of Patent: Aug. 11, 1992

[54] ROLLING BEARING

[75] Inventors: Yasuo Murakami, Yamato; Kyozaburo Furumura, Kanagawa; Shinichi Shirota, Ebina; Shigeru Okita, Yokohama, all of Japan

[73] Assignee: Nippon Seiko Kabushiki Kaisha, Tokyo, Japan

[21] Appl. No.: 699,901

[22] Filed: May 14, 1991

[30] Foreign Application Priority Data

May 17, 1990 [JP] Japan ................... 2-127930

[51] Int. Cl.⁵ ............................................. F16C 33/62
[52] U.S. Cl. ..................... 384/450; 384/492; 384/565; 384/569; 384/912
[58] Field of Search .............. 384/450, 912, 492, 565, 384/569, 913, 910

[56] References Cited

U.S. PATENT DOCUMENTS

| 4,904,094 | 2/1990 | Furumura et al. | 384/492 |
| 5,011,304 | 4/1991 | Murakami et al. | 384/492 |
| 5,030,017 | 7/1991 | Murakami et al. | 384/912 |

FOREIGN PATENT DOCUMENTS 62-24499  5/1987  Japan.
2-34766   2/1990  Japan.

Primary Examiner—Lenard A. Footland
Attorney, Agent, or Firm—Basile and Hanlon

[57] ABSTRACT

A rolling bearing having bearing rings and rolling members wherein at least one of the bearing rings and the rolling members essentially consists of an alloy steel which contains carbide-forming elements. The bearing rings and the rolling members are subjected to carburizing or carbo-nitriding and then hardening to form a rolling surface layer. The content of retained austenite ($\gamma_R$ vol %) in the rolling surface layer is from 20 to 45% by volume and the hardness (Hv) of the rolling surface layer reinforced by dispersion of fine carbides or carbo-nitrides with an average grain size of from 0.5 to 1.5 μm with regard to the content of the retained austenite ($\gamma_R$ vol %) is within the range of:

$$-4.7 \times (\gamma_R \text{ vol } \%) + 920 \leq Hv \leq -4.7 \times (\gamma_R \text{ vol } \%) + 1020.$$

5 Claims, 3 Drawing Sheets

ROLLING BEARING

BACKGROUND OF THE INVENTION

1. Field of the Invention

The present invention relates to a rolling bearing and, in particular, to an improvement in the life of a rolling bearing used, for example, in transmissions and engines for automobiles, agricultural machines, construction machines and iron and steel machines.

2. Description of the Prior Art

Foreign substances entrained in a bearing lubricant are one of the factors which reduce the life of a rolling bearing. It has been known that cutting powders, scraping dusts, burrs and abrasion powders of metals are entrained in the bearing lubricant and injure the bearing rings and/or the rolling members of the rolling bearing so as to reduce the life of the rolling bearing. Then, there has been a problem that the bearing life is reduced to about 1/10 as compared with the case of a bearing employing a lubricant with no entrained foreign substances.

Further, as in the case of pitching caused in transmission gears in automobiles, spot-like minute pores are formed on the bearing surface of the rolling surface of the bearing due to rolling fatigue which reduce the life of the rolling bearing. In view of the above, it has been known, such as disclosed in Japanese Patent Publication Sho 62-24499 and Japanese Patent Laid-Open Hei 2-34776, to provide a low-medium carbon low alloy steel with improved hardness of the steel surface and improved pitching resistance in which spherical carbides are precipitated to the surface of a low-to-medium carbon or a low-alloy steel by a heat treatment, such as carburization.

When the surface hardness of the bearing rings and the rolling members is improved as in the prior art described above, any impressions due to the foreign substances are moderated. On the contrary, toughness of the bearing ring and the rolling member becomes poor and a crack is formed from a portion injured by the foreign substances existing in the lubricant. This acts to initiate flaking from such portions at an early stage and, accordingly, there is a limit for the improvement of the life of the rolling bearing.

In view of the above, U.S. Pat. No. 4,904,094 was proposed by several of the present Applicants in which stress concentration at the edge portion of the impression caused by foreign substances is relaxed to suppress the formation of a crack and to thereby improve the life of the rolling bearing by adjusting the content of carbon, the content of retained austenite and the content of carbonitride in the rolling surface layer of the rolling bearing to appropriate values even in a case where the rolling bearing is used under lubrication with entrained foreign substances.

In the prior art disclosed in U.S. Pat. No. 4,904,094, the life of a rolling bearing under lubrication with entrained foreign substances can be improved by an appropriate content of retained austenite; but, on the other hand, there is a problem that the surface hardness is lowered by the retained austenite which reduces the fatigue resistance. That is, there is still room for the improvement of an appropriate relationship between the content of the retained austenite and the surface hardness.

Further, in the prior art bearing material, no consideration is taken of determining the value for the grain size of carbides and carbonitrides for improving the life of the bearing. When large sized carbides undergo repeated stresses, there is a problem that the large-sized carbides act as initiation sites for fatigue to cause cracks and flaking.

In view of the above, an object of the present invention for eliminating such a problem is to provide a rolling bearing having a longer life than that of the prior art products even under clean lubrication as well as under lubrication with entrained foreign substances by finding an optimum relationship between the content of the retained austenite and the surface hardness in a rolling surface layer and, further, by adjusting the average grain size of carbides and carbonitrides existing in the rolling surface layer to optimum values.

SUMMARY OF THE INVENTION

The present invention for attaining the foregoing object concerns a rolling bearing having bearing rings and rolling members, wherein at least one of the bearing rings and the rolling members essentially consists of an alloy steel which contains carbide-forming elements therein, the bearing rings and the rolling members having been subjected to carburizing or carbo-nitriding, and then hardening, for forming a rolling surface layer. The content of retained austenite content ($\gamma_R$ vol %) in the rolling surface layer is from 20 to 45% by volume and a hardness (Hv) of the rolling surface layer by dispersion of fine carbides or carbonitrides with an average grain size of from 0.5 to 1.5 μm with regard to the content of the retained austenite ($\gamma_R$ vol %) is within a range:

$$-4.7\times(\gamma_R \text{ vol }\%)+920 \leq Hv \leq -4.7\times(\gamma_R \text{ vol }\%)+1020.$$

In a rolling bearing of a modified embodiment of the present invention, the alloy steel contains from 0.3 to 0.7% by weight of carbon (C) and from 1 to 3% by weight of Chromium (Cr).

DESCRIPTION OF THE PREFERRED EMBODIMENTS

In the present invention, carbide-forming elements are positively added so that the reduction of the surface hardness caused by the existence of the retained austenite can be compensated for by the precipitating reinforcement of fine carbides. The present invention provides a rolling bearing having a long life by adjusting the relationship between the content of the retained austenite and the surface hardness to an optimum range.

Descriptions will now be made specifically to the function and the critical meanings of characteristic values of the alloy steel according to the present invention.

Content of Retained Austenite in Rolling Surface Layer ($\gamma_R$ vol %): 20-45 vol %

Figure 2:
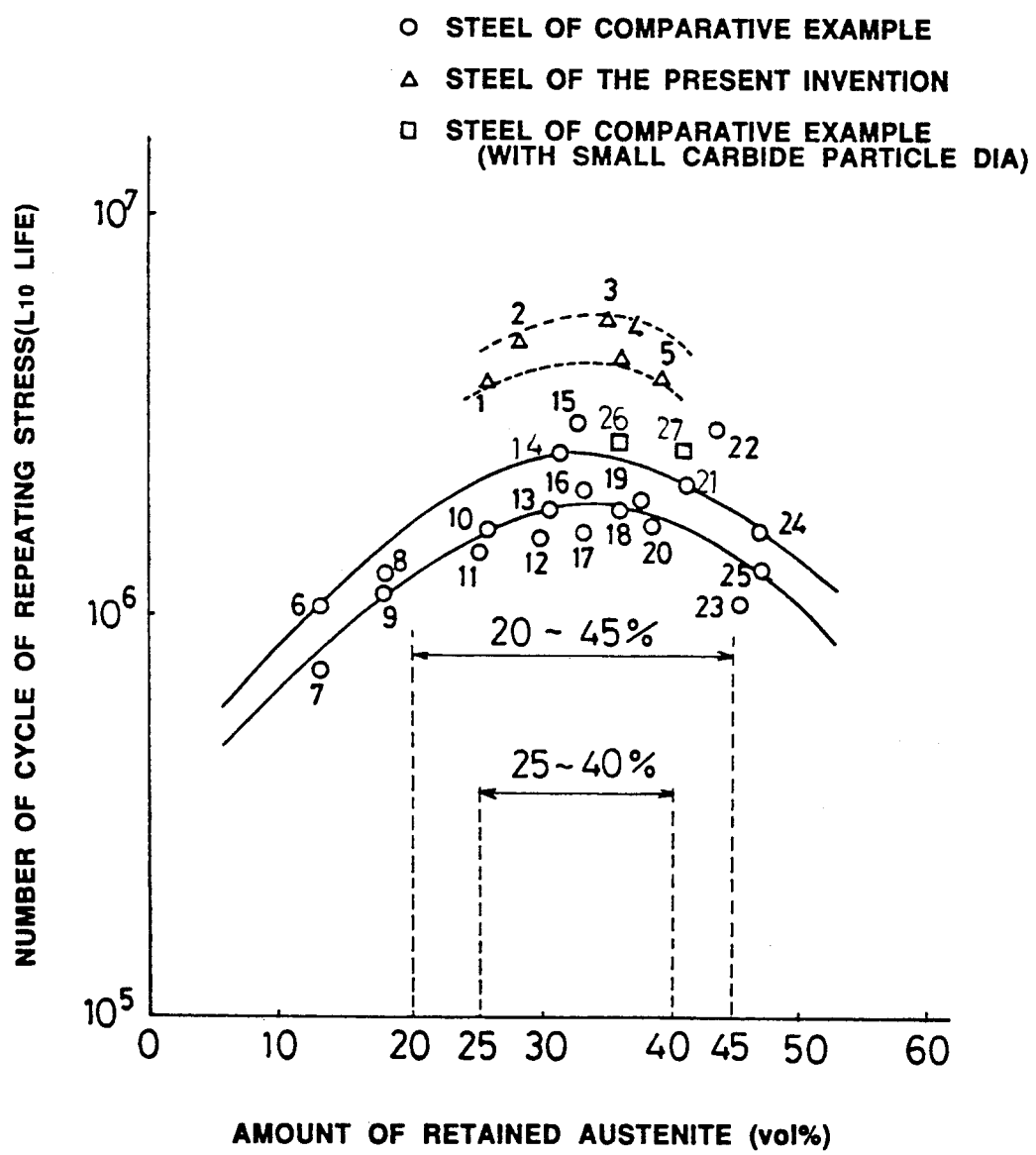
FIG. 2 is a characteristic diagram of the relationship of the content of retained austenite and the cycles of stress repetition in a rolling bearing steel.

An impression is generated in the rolling surface layer by foreign substances entrained in a lubricant or the like. A crack which is liable to be formed at an edge portion of the impression is closely related to the retained austenite. The retained austenite is usually soft and viscous, although somewhat different depending on the carbon content in the raw material. Accordingly, when the retained austenite is allowed to exist at a desired ratio in the rolling surface layer, stress concentration at the edge portion of the impression can be relaxed so as to retard the development of a crack. Further, the retained austenite in the rolling surface layer can improve the life of the rolling bearing under lubrication with entrained foreign substances due to the effect that it is subjected to martensitic transformation and hardened by the deformation energy applied to the surface after a predetermined number of relative passes of a member (for example, a bearing ring relative to a rolling member) over the impression during rolling. The content of the retained austenite in the rolling surface layer capable of making such an effect to a maximum is 20 to 45 vol % as shown in FIG. 2.

If the content of the retained austenite is less than 20 vol %, a sufficient effect for the stress concentration upon development of the dust impression cannot be attained.

Further, if the content of the retained austenite exceeds 45 vol %, the relaxing effect for the stress concentration is saturated and the surface hardness is lowered which reduces the fatigue resistance.

In view of the above, the content of the retained austenite in the rolling surface layer is defined as being from 20 to 45 vol % and, preferably, from 25 to 40 vol %.

The content of the retained austenite can be controlled, for example, by selecting the hardening temperature and the hardening method or by adjusting the concentration of carbon solid-solubilized into a matrix.

In the present invention, "surface layer" means a range from a surface to a desired depth, for example, to a depth corresponding to 2% of the mean diameter for the rolling member at which the shearing stress reaches its maximum.

Figure 1:
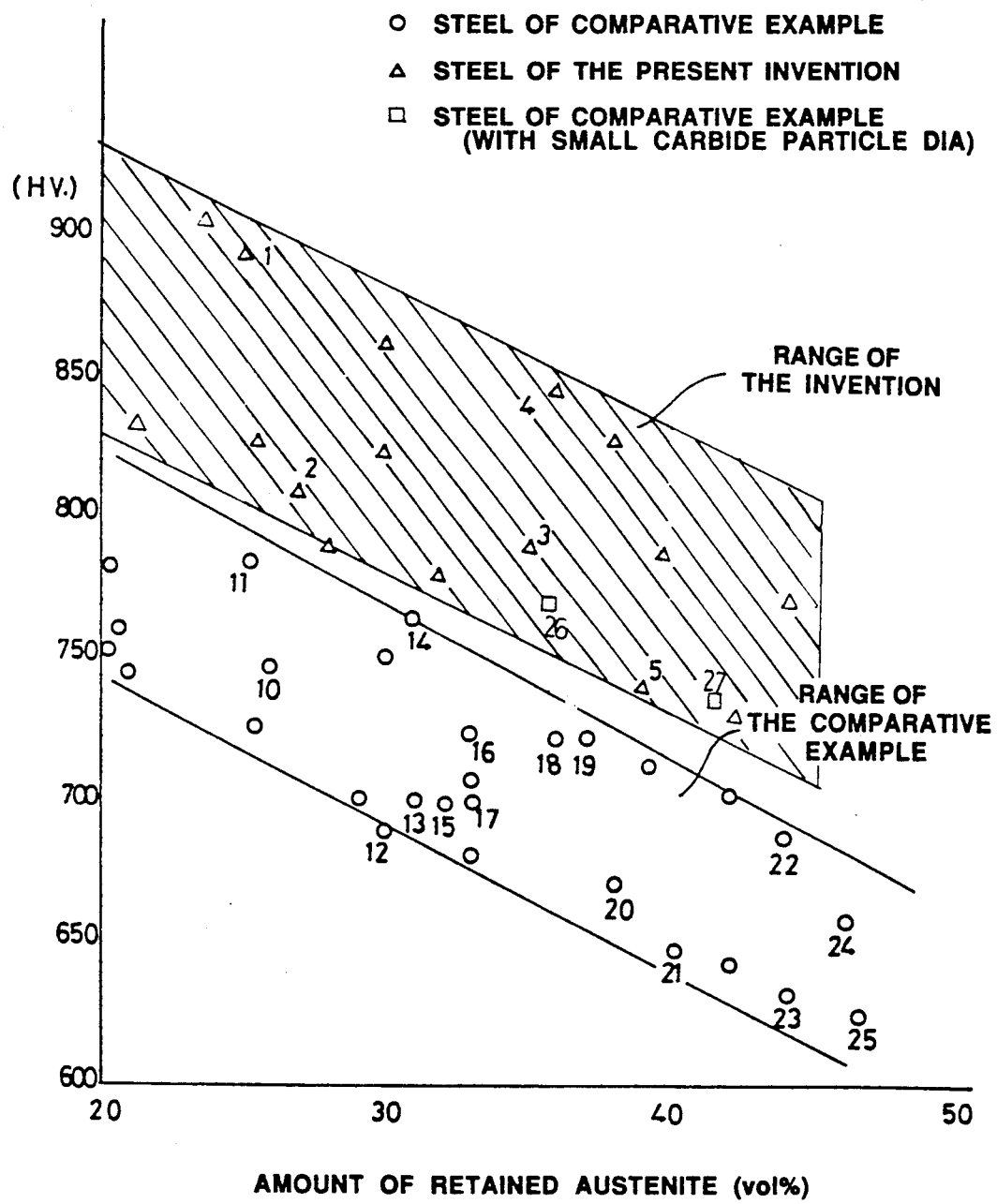
FIG. 1 is a characteristic diagram of the relationship of the content of retained austenite and the surface hardness of a rolling bearing steel.

Average Grain Size of Fine Carbide and/or Carbonitride Present in the Rolling Surface Layer: 0.5-1.5 μm As shown in the range for the comparative example in FIG. 1, it can be seen that the surface hardness (Hv) is lowered as the content of the retained austenite ($\gamma_R$ vol %) is increased. In view of the above, in the present invention, the surface hardness relative to the content of the retained austenite can be improved by precipitating reinforcement with fine carbides and carbonitrides as shown in the range of the present invention in FIG. 1.

The average grain size of the carbides and the carbonitrides herein is from 0.5 to 1.5 μm. If the average grain size is less than 0.5 μm, an improvement in the life of the rolling bearing is insufficient and the abrasion resistance is reduced. Further, if the average grain size exceeds 1.5 μm, the carbides and the carbonitrides constitute stress concentration sources by which cracks, etc., are liable to be developed to reduce the life of the rolling bearing.

The content of the fine carbides and the carbonitrides contained in the rolling surface layer is desirably from 10 to 20% as expressed by the area ratio. If the content of the carbides and the carbonitrides is insufficient, lowering of the surface hardness relative to the increase of the retained austenite content cannot be compensated for. On the other hand, if the content of the carbides and the carbonitrides is too high, the carbides are made coarser and, in addition, the content of the carbon solid-solubilized into the matrix is reduced, so as to cause a failing to maintain a necessary content of the retained austenite. The content of the carbides and the carbonitrides can be controlled, for example, by adjusting the amount of the carbide-forming elements, or controlling the tempering temperature.

As the carbide-forming elements, there can be various known elements such as Cr, Mo, V and W (W also forms carbonitrides). Cr is particularly preferred.

Various kinds of carbides are formed by incorporating one or more of desired carbide-forming elements among them.

The carbonitrides referred to herein means the carbides described above and nitrides, such as $Fe_3(CN)_4$, when carbonitridation is applied instead of carburization.

Cr is preferred as the carbide-forming element.

Cr is a carbide-forming element necessary for improving the hardenability and the anti-temperability of steels, as well as for precipitating fine carbides to improve the hardness of the alloy steel. The content of Cr suitable to the refinement of carbides precipitated in the rolling surface layer is from 1 to 3% by weight.

Although it is possible to increase the concentration of carbon by applying a carburization or other like treatment to a steel with a Cr content of less than 1% by weight to thereby increase only the surface hardness, this treatment forms less nuclei which tend to grow carbides and form macro carbides.

Figure 3:
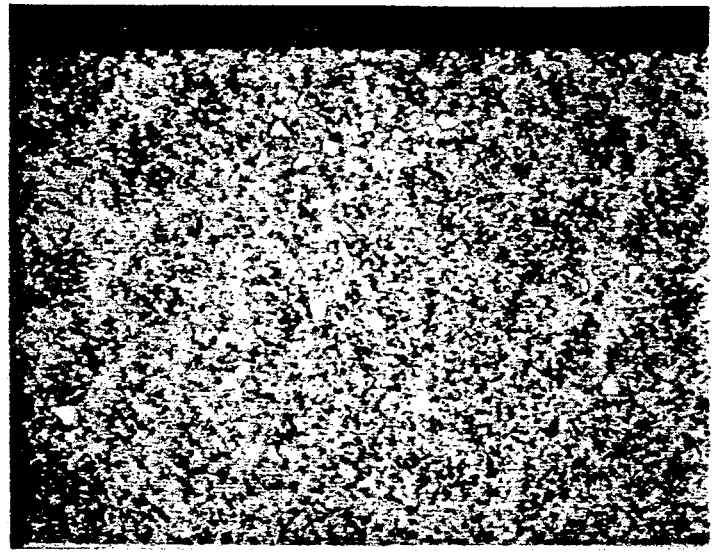
FIG. 3 is a photograph showing the metal tissue of SUP9.

FIG. 3 is a photograph (×400) of the texture of macro carbides with an average grain size of about 5 μm precipitated to the surface layer when SUP9 (spring steel material: Manganese-chromium steel: C 0.6%, Mn 0.8%, Cr 0.8%) is applied with carburizing hardening, in which carbides are shown as white spots. In the photograph, white lumps correspond to macro carbides.

If the C content exceeds 3% by weight, macro carbides are crystallized in the raw material, and the life of the rolling bearing is lowered due to stress concentration. This is not advantageous in view of the cost, as well as reducing the productivity of heat treatment, since heat treatment, high temperature hardening or the like is necessary for the solid-solubilization and re-precipitation of the carbides in the matrix in order to refine the macro carbides.

As a method of manufacturing the raw material, known powder sintering, etc., can be employed in addition to casting. The powder sintering is a preferred method since macro carbides and carbonitrides are not crystallized in the stage of the raw material upon sintering.

As other carbide-forming elements, for example, less than 8% by weight, particularly, less than 2.0% by weight of Mo, less than 7% by weight, particularly, less than 3% by weight of V, and less than 25.0% by weight of W can be properly incorporated as required.

Further, spherodizing annealing may be applied upon precipitating the fine carbides.

Hardness of the Rolling Surface Layer (Hv):
$-4.7 \times (\gamma_R$ vol %$) + 920 \leq Hv \leq -4.7 \times (\gamma_R$ vol %) + 1020 Relative to the Content of Retained
Austenite in the Rolling surface Layer ($\gamma_R$ vol %)    (1)

In the present invention, the range of the hardness corresponding to each content of the retained austenite is defined as within the range (1) described above.

In the relationship (1) above, if the hardness is less than the lower limit value, the fatigue resistance is lowered to reduce the life of the rolling bearing under lubrication with entrained foreign substances and under clean lubrication. On the other hand, it is difficult to increase the hardness to greater than the upper limit value. In view of the above, the relationship as shown in (1) is derived.

As the alloy steel used in the present invention, a case hardening steel having a low-to-medium carbon content (C: 0.3–0.7% by weight), as well as a high carbon chromium bearing steel and a high temperature bearing high speed steel having a medium-to-high carbon content (C: 0.7–1.2% by weight) can be used.

The reason for defining the content of carbon in the case hardening steel to the above-mentioned values will now be explained.

In the carburizing method, since solid solubilization of carbon into a matrix is conducted by both the base carbon existing initially in the matrix and the carbon penetrated and solid solubilized into the matrix by carburization, a uniform solid solution can be obtained. In the hardening of the bearing steel, when the base carbon is solid solubilized into the matrix, the content of carbon is limited to about 0.5% by weight, but the limit for the solid solubilization in the carburizing method can exceed the range of 1% by weight. Then carbon atoms can inhibit migration of inversion caused by rolling fatigue to prevent plastic deformation due to accumulation of inversion and, accordingly, development of micro-cracks can be retarded to attain long life and high reliability of the rolling bearing.

When the surface hardening is applied by the carburization or carbonitridation, if the content of C is less than 0.3% by weight, the content of C or N penetrated into the case hardening steel by carburization or carbonitridation has to be increased in order to obtain the surface hardness intended in the present invention. Consequently, the heat treatment time for the carburization or carbonitridation is increased to lower the productivity of heat treatment. Further, since the hardness of the core becomes insufficient, the core suffers from plastic deformation which reduces the life of the rolling bearing.

On the contrary, if the content of C exceeds 0.7% by weight, the content of C or N penetrated into the case hardening steel by the carburization or carbonitridation is decreased. Therefore, the ratio of C or N penetrated and solid-solubilized into the case hardening steel is lowered to bring about an inhomogeneous state of solid solution so that the portion constitutes a source for stress concentration which reduces the life of the rolling bearing. From the foregoing, it is desirable to define the content of C in the case hardening steels which is used for at least one of the bearing rings and the rolling members as from 0.3 to 0.7% by weight. EXAMPLE A description will now be made to examples of the present invention.

Carburizing heat treatment was applied to test specimens 1–5 comprising a steel of a composition as shown in Table 1 as a material prepared by casting and to test specimens 6–27 using steels, such as SCR420, SCM420 and SUP9. Subsequently, the content of the retained austenite, the average grain size of carbides and the surface hardness were measured for each of the test specimens 1–27.

The amount of the retained austenite has a close relationship with the solid solubilized C (%). The concentration of C (%) in the surface layer was varied by the control of the diffusion time in an ion carburizing step to thereby vary $\gamma_R$ in the surface layer. The effect on the hardness by the formation of the carbides and the relation with the hardness were determined to obtain the results shown in Table 2.

That is, since carbon solid-solubilized by carburization to the surface layer is diffused more toward the core as the diffusing time is longer, the carbon concentration C (%) in the surface layer is reduced and, as a result, $\gamma_R$ (vol %) after quench hardening is reduced. On the other hand, if the diffusing time is shorter, diffusion of carbon from the surface to the core is suppressed which results in the increase in the carbon concentration C (%) in the surface layer and, also, an increase of $\gamma_R$ (vol %). The content of the retained austenite was determined by X-ray analysis and the average grain size of the carbides was measured by a microscope.

The content of the retained austenite, the average grain size of the carbides and the surface hardness for each of the test specimens 1–27 are shown in Table 2 and FIG. 1. In Table 2, the test specimens 1–5 are steels according to the present invention with all of their characteristic values being within the range of the present invention, while the test specimens 6–25 are steels of comparative examples, in which the range of the surface hardness relative to the content of the retained austenite is less than the lower limit value of the present invention, the carbide grain size is out of the range of the present invention and the content of the retained austenite corresponds to at least one of the steels out of the content range of the present invention. The test specimens 26 and 27 are steels of the comparative examples in which the surface hardness and the content of the retained austenite are within the range of the present invention; but the average grain size of the carbides is out of the range of the present invention.

Test specimens 26 and 27 are made of SCM420 in which fine carbides are precipitated by the effect of Mo (Mo: 0.21%) and the hardness is increased for the identical $\gamma_R$.

However, since the addition amount of Mo is low, although the surface hardness (Hv) within the range of the present invention can be attained at $\gamma_R$—36.42%, carbides are small in grain size and less in the number and, accordingly, the fatigue life is lowered.

TABLE 1

| | Ingredient | | | | | | | | |
|---|---|---|---|---|---|---|---|---|---|
| | C | Si | Mn | Ni | Cr | Mo | Cu | P | S |
| % by weight | 0.42 | 0.25 | 1.09 | 0.08 | 2.71 | 0.36 | 0.10 | 0.014 | 0.008 |

A description will be made of one example of the carburizing method. As for the carburization, ion carburization was applied. The conditions in each of the steps of temperature elevation, cleaning, carburization, diffusion, hardening and tempering in the ion carburization are as shown below.

Temperature elevation was conducted under a vacuum degree of 0.01 Torr, up to 950° C. for 1.5 hours.

Cleaning was conducted under a vacuum degree of 1.3 Torr, at 950° C. for 0.33 hours. In this case, electric glow discharging at 100 V, 2 A was conducted. Ar: 2.5 l/min, and H$_2$: 1.0 l/min were used as gasses.

Carburization was applied under a vacuum degree of 2.0 Torr, at 950° C. for 3 hours. C$_3$H$_8$: 0.5 l/min was used as the carburizing gas.

Diffusion: 950° C.×1 hour. Hardening: 60° C.×0.25 hours, oil hardening. Tempering: 180° C.×2 hours.

Then, a plurality of disc-like materials were prepared for each of the thus obtained test specimens and a thrust life test was conducted by using a thrust form bearing steel testing machine as described in "Handbook of Special Steel", p 10-21 (First edition, edited by Denki Seiko Kenkyusho, published from Rikogakusha, May 25, 1969). The test conditions are as follows.

N = 1000 rpm
P$_{max}$ = 500 kgf/mm$^2$
Lubricant oil: #68 turbine oil

In the life test, Fe$_3$C type powder (74–147 μm diameter) with hardness Hv = 870 was used as dusts, which were incorporated at 300 ppm in the lubricant oil.

In this test, the time at which a crack or flaking capable of being observed by a microscope or with naked eyes was developed to 10% in each of the test specimens was judged as the life (L$_{10}$ life) and the life was quantitatively expressed by the accumulated number of rotations up to that time.

The results of the life test are shown in Table 2 and in FIG. 2.

TABLE 2

| Test Specimen No. | γ$_R$ vol % | Surface Hardness (Hv) | Average particle of dia (μm) | L$_{10}$ life (× 10$^6$ cycle) |
|---|---|---|---|---|
| 1 | 25 | 888 | 1.5 | 3.85 |
| 2 | 27 | 806 | 0.8 | 4.99 |
| 3 | 35 | 789 | 1.1 | 5.44 |
| 4 | 36 | 844 | 0.7 | 4.38 |
| 5 | 39 | 740 | 0.5 | 3.93 |
| 6 | 13 | 759 | 1.4 | 1.04 |
| 7 | 12 | 762 | 1.0 | 0.74 |
| 8 | 19 | 778 | 2.6 | 1.30 |
| 9 | 18 | 792 | 1.7 | 1.14 |
| 10 | 26 | 747 | 0.4 | 1.68 |
| 11 | 25 | 783 | 2.2 | 1.48 |
| 12 | 30 | 689 | 0.2 | 1.61 |
| 13 | 31 | 701 | 0.3 | 1.87 |
| 14 | 31 | 764 | 1.6 | 2.60 |
| 15 | 32 | 699 | 0.4 | 3.09 |
| 16 | 33 | 724 | 2.9 | 2.09 |
| 17 | 33 | 700 | 0.1 | 1.65 |
| 18 | 36 | 723 | 1.6 | 1.88 |
| 19 | 37 | 723 | 1.8 | 2.00 |
| 20 | 38 | 671 | 0.4 | 1.72 |
| 21 | 40 | 647 | 0.1 | 2.19 |
| 22 | 46 | 687 | 1.3 | 2.96 |
| 23 | 44 | 632 | 0.2 | 1.09 |
| 24 | 46 | 658 | 3.1 | 1.68 |
| 25 | 47 | 624 | 0.3 | 1.36 |
| 26 | 36 | 762 | 0.3 | 2.90 |
| 27 | 41 | 738 | 0.3 | 2.72 |

FIG. 1 shows the relationship between the content of the retained austenite and the surface hardness in which reference numerals correspond to the numbers of the test specimens, respectively, FIG. 2 shows the relationship between the content of the retained austenite and the life in which the reference numerals correspond to the numbers of the test specimens, respectively.

As shown in FIGS. 1 and 2 and Table 2, it can be seen that satisfactory life is attained for the test specimens 1-5 in which the content of the retained austenite, the surface hardness relative to the content of the retained austenite, and the average grain size of the carbides are within the range of the present invention, as compared with the test specimens 6-27.

Although the test specimens 1-5 using the steels of the composition shown in Table 1 as the material were used in this example, the ingredients show one example and steels of other ingredient compositions may also be used with no particular restriction thereto.

Further, although ion carburization was applied as the carburizing method in this example, gas carburization or the like may be applied with no particular restriction thereto. Further, it is, of course, possible to use carbonitridation instead of carburization.

As described above according to the present invention it is possible to attain an advantageous effect capable of providing a long-life rolling bearing under lubrication with entrained foreign substances, as well as under clean lubrication, by positively adding carbide-forming elements and compensating for the reduction of the surface hardness due to the presence of the retained austenite by precipitating reinforcement of fine carbides and, in addition, by making the relationship between the content of the retained austenite and the surface hardness to an optimum range.

What is claimed is:

1. A rolling bearing having bearing rings and rolling members comprising:

at least one of the bearing rings and the rolling members consisting essentially of an alloy steel which contains carbide-forming elements therein, the bearing rings and the rolling members being subjected to carburizing or carbo-nitriding, and then hardening, to form a rolling surface layer, the content of retained austenite content (γ$_R$ vol %) in the rolling surface layer being from 20 to 45% by volume, and the hardness (Hv) of the rolling surface layer reinforced by dispersion of fine carbides or carbonitrides with an average grain size of from 0.5 to 1.5 μm with regard to the content of the retained austenite is within a range of:

$$-4.7 \times (\gamma_R \text{ vol } \%) + 920 \leq \text{Hv} \leq -4.7 \times (\gamma_R \text{ vol } \%) + 1020.$$

2. The rolling bearing as defined in claim 1 wherein the alloy steel contains from 0.3 to 0.7% by weight of carbon and from 1 to 3% by weight of chromium.

3. The rolling bearing as defined in claim 2 wherein the carburizing or carbo-nitriding is ion carburizing or ion carbo-nitriding.

4. The rolling bearing as defined in claim 1 wherein the alloy steel contains from 0.3 to 0.7% by weight of carbon, from 1 to 3% by weight of chromium and from 0.35 to 2.0% by weight of molybdenum.

5. The rolling bearing as defined in claim 4 wherein the carburizing or carbo-nitriding is ion carburizing or ion carbo-nitriding.

* * * * *